Patented Jan. 5, 1954

2,665,249

UNITED STATES PATENT OFFICE 2,665,249

WASTE DISPOSAL

Frederick J. Zimmermann, Wausau, Wis., assignor to Sterling Drug Inc., New York, N. Y., a corporation of New York No Drawing. Application March 27, 1950, Serial No. 152,264

9 Claims. (Cl. 210—2)

The present invention relates to the destructive oxidation of organic matter in liquid waste effluents, and more specifically to the treatment of waste sulphite liquor to effect complete or substantially complete oxidation of the organic matter therein.

Liquid waste effluents have presented pollution and disposal problems for a long time. Many investigators have worked on these problems and have produced a wide variety of results, some of which have limited utility under special conditions but most of which have not come into commercial use. The difficulties are manifold. One of the primary problems to be overcome is the pollution of streams and bodies of water due to the discharge of aqueous waste effluents thereinto. These effluents may either be those resulting from factory or mill operations or may be community waste. In a number of localities, laws prohibit the discharge of waste effluents into streams or other bodies of water, although due to conditions in certain areas, it is impractical to enforce those laws rigidly. As a result, all sorts of waste matter are emptied into bodies of water causing contamination, destruction of animal and plant life, and serious health hazards. Where such waste matter commingles with water which may be reused, elaborate precautions must be taken to guard against human and mechanical ill effects. The loss of marine growths and fish is often a serious matter not only intrinsically but because it destroys the oxygen balance set up as a complete cycle by nature.

The patent and scientific literature abound with proposals for overcoming or minimizing the above situation. These proposals most commonly take three forms: (1) evaporation followed by combustion; (2) the use of chemicals to render innocuous the matter to be disposed of; and, (3) partial oxidation of waste sulphite liquor at temperatures up to 200 degrees centigrade to form sulphuric acid in situ which will cause the precipitation of lignin in a form separable by filtration from the watery effluent. Evaporation and combustion have been found to be too expensive, although in some instances such procedure has been commercially employed in order to avoid law violation and the imposition of fines and, while there is sometimes a small by-product recovery from such operations, the net result is invariably a stiff item of expense which has to be charged against the operations of the mill, plant or community as a whole.

Evaporation is frequently impracticable where large volumes of liquid are involved, and only large units of industry can afford to be subjected to the very considerable initial investment and charges thereby incurred. Evaporation followed by combustion is also a relatively slow operation which requires substantial amounts of heat and in many instances the waste effluent exists at a place where it cannot be so treated and where it would not pay to bring in expensive equipment even if the expense thereof could be afforded. This is particularly pertinent in connection with the pulp and paper industry where the plants and mills are frequently located at the site of the raw material, which is often in small and relatively isolated areas. Due to precipitation on the heat exchange surfaces, this procedure is also difficult to operate.

Chemical treatment has certain advantages in that, depending upon the nature of the waste effluent, chemical values can sometimes be recovered from the effluent. There are some limited instances in which this is more or less satisfactory, but as a general solution of the waste effluent problem, it is a very minor factor. Chemical treatment generally depends upon an analysis of the materials occurring in the waste effluent and the addition of appropriate chemicals so as to effect predetermined chemical reactions which enable limited amounts of chemical by-products to be secured by recovery procedures. Where such is feasible it generally results in focussing attention upon the by-product recovery and not upon the waste disposal problem with the result that the waste effluent is frequently as harmful as it was before, and in some cases is definitely worse.

The partial oxidation procedure, although widely known for over thirty years and the subject of extensive research and improvement, has not solved the critical problem of the disposition of industrial carbonaceous wastes such as waste sulphite liquor.

Some miscellaneous procedures are used in certain instances in an effort to solve the waste disposal problem and these efforts commonly involve aeration, chlorination, and the like. These are more or less satisfactory for the limited purposes in view but do not constitute a solution of the general problem and frequently the treated water has a strong taste or odor imparted thereto, or its corrosiveness on pipes, motors and metal equipment is considerably increased. It therefore seems evident that no one has solved the over-all problem presented in disposing of waste matter, not only to render the liquid effluent completely innocuous, but so as to avoid large debits to be charged against operations.

It is, accordingly, one of the major objects of the present invention to make it possible to treat liquid waste effluents without resorting to expensive or difficult operations and without operating at an over-all loss.

Another object of the invention resides in the treatment of liquid waste effluents under such conditions that it is not necessary to reduce the liquid volume of the effluent to any substantial extent, if at all, thereby avoiding evaporation, dehydration and other time-consuming procedures requiring the use of expensive equipment.

A further object of the invention resides in a simple treatment of liquid waste effluents by means of which the organic matter which exists therein in dissolved, suspended or precipitated form is completely or substantially completely oxidized to its ultimate end-products, viz., carbon dioxide, water and gases (chiefly nitrogen), constituting practically the sole products resulting from the present procedure.

A still further and more specific object of the invention resides in the treatment of liquid waste effluents with compressed air at a moderately increased temperature under such conditions that the organic matter present is completely or substantially completely oxidized to end products which are all of an innocuous nature.

An auxiliary object of the invention resides in utilizing the autogenetically produced heat for the production of substantial amounts of by-product steam and/or power sufficient after the initiation of the oxidation to make the same self-sustained so that further or outside additions of steam and/or power are ordinarily not required.

Other and further objects and advantages will be appreciated by those skilled in this art or will be apparent or pointed out hereinafter.

Referring first to the invention in general terms, I wish to point out that it is applicable to a wide variety of waste materials arising from various industrial or community sources. The invention can be utilized whenever the nature of the waste effluent is such that it contains organic matter susceptible of being completely or substantially completely oxidized to innocuous end-products under relatively moderate temperature and pressure conditions. While it is not practicable to give an exhaustive summation of the various liquid waste effluents to which the present invention can be applied, the uses are many and include waste sulphite and kraft liquors resulting from paper and pulp mill operations, the waste resulting from sewage disposal systems, the waste effluent resulting from slaughterhouse operations, the waste produced by plants manufacturing synthetic or other chemicals or products such as plastics, rubber, dyes, pharmaceuticals, et cetera, and the liquid waste materials resulting from the production of various products from milk and milk solids.

The invention is particularly characterized by the fact that it is unnecessary to reduce the volume of the waste sulphite liquor or other liquid waste effluents or to resort to procedures such as dehydration or evaporation. While combustion does not occur in the accepted sense, a flameless combination of oxygen with organic matter takes place in the presence of the liquid of the waste effluent with the production of useful amounts of heat energy. The invention is further characterized by the fact that all organic material in the waste sulphite liquor or other liquid waste effluent is completely or substantially completely oxidized to its end-products and thus the invention is particularly to be distinguished from partial oxidation procedures, especially those in which a catalyst is employed because it will be noted that no catalyst is necessary or utilized in connection with my present procedure.

The quantity of free oxygen supplied is preferably that theoretically required to convert all of the combustible matter in the waste to its end products, such as carbon dioxide, water, et cetera, or, slightly in excess of such amount, which is readily determinable from analysis of the waste. In general, at least one molecule of oxygen per atom of carbon in the combustible matter is desired.

In instances where the combustible matter content of the aqueous waste dispersion is insufficient to maintain combustion, other combustible matter, such as oil sludge, comminuted organic refuse, coal dust, et cetera, may be added in amount sufficient to enable continuous operation within the temperature ranges herein set forth. This also permits the application of the process in the evaporation of brines without contamination of the salts which it may be desired to recover. External heating may be employed, if desired, in instances where the combustible content of the waste material is insufficient to maintain combustion.

For convenience the invention will hereinafter be described in detail with reference to waste sulphite liquor, but with the understanding that such constitutes no limitation or restriction upon the invention.

The apparatus used consisted of a pump for the aqueous carbonaceous dispersion; an air compressor; an oil-jacketed tower reactor, provided with means to remove periodically any precipitate therein; and a flash chamber to receive the reaction product from the reactor.

In starting up the apparatus, air under a pressure of about 1500 pounds per square inch gauge was admitted to the reaction system. The oil bath around the reaction was heated to about 536 degrees Fahrenheit and the reactor filled about two-thirds full of waste sulphite liquor.

Lime sufficient to convert the sulphur in the waste sulphite liquor to calcium sulphate had been added. The liquor had the following analysis:

| | |
|---|---|
| Solids content_____pounds/gallon__ | 0.72[1] |
| Carbon _____do____ | 0.263 |
| Sulphur _____do____ | 0.040 |
| Calcium _____do____ | 0.080 |
| Ash _____do____ | 0.190 |
| Oxygen demand (iodate value)_____ | 0.865 |
| pH _____ | 9.4 |
| Specific gravity _____ | 1.042 |

[1] 8,000 B. t. u. per pound.

When the liquor in the reactor reached a temperature of about 518 degrees Fahrenheit, sufficient liquor was pumped into the reaction system to fill the same with liquid. The heating of the oil was discontinued and air was continuously supplied to the reactor at a pressure of about 1500 pounds per square inch gauge and a temperature of about 86 degrees Fahrenheit. The rate of air supply was 400 pounds per hour, providing 92.6 pounds of oxygen per hour. Waste liquor at a temperature of about 65 degrees Fahrenheit was pumped into the reactor under a pressure of about 1500 pounds per square inch gauge at a rate of about 78 gallons per hour.

The precipitated calcium sulphate was periodically removed from the reactor. The liquor leaving the reactor was passed into the flash chamber. From this chamber the fixed gases, i. e., nitrogen, carbon dioxide, and any excess air, were bled off with steam at about 1500 pounds per square inch gauge. The liquid effluent from the flash chamber and the condensate steam with the fixed gases had an oxygen demand less than 2 percent of the oxygen demand of the raw waste sulphite liquor.

The effluent from the flash chamber amounted to 5.8 pounds per gallon of liquor fed to the reactor and was at a temperature of 540 degrees Fahrenheit. The flash contained 2.2 pounds of water per gallon of liquor fed, under a pressure of 1500 pounds per square inch gauge. The heat balance on a run of 171 gallons showed:

Input: 171 gallons×0.72 pound
 solids per gallon×8,000 B. t. u. = 985,000 B. t. u.
Recovered:
 375 pounds flash steam (540°
  F.)×1,200 B. t. u. =450,000 B. t. u.
 922 pounds effluent (540° F.) =170,000 B. t. u.
  ×475 B. t. u. ─────────── 920,000 B. t. u.

Radiation and loss = 65,000 B. t. u.

The figures were checked by the rise in the temperature of the cooling water through which the effluent and flash condensate were passed. This shows an actual recovery of 93.4 percent of theory of the fuel value of the combustible material in the form of usable heat energy, which figure, while well above the figure possible by other processes of combusting such materials, is even higher in large-scale equipment due to a decrease in radiation loss particularly.

In a manner similar to that just described for sulphite waste liquor, I have operated my process utilising Masonite wood waste liquor, whey from cheese plants, kraft liquor, number three fuel oil at a concentration of 0.556 pound per gallon of water, and aqueous coal dispersions. While the minimum starting or ignition temperatures varied somewhat, the process operated smoothly and at efficiencies of 95 percent or better of theory in each instance at temperatures of 500 to 550 degrees Fahrenheit.

A certain minute amount, less than 2 percent of original biochemical oxygen demand, as measured by the standard iodate method, remained at the end of each of the above oxidation operations. Even this small amount of oxygen demand can be eliminated in larger scale operations.

My process is limited to the continuous oxidation of the oxidizable materials in aqueous dispersion carried out as flameless combustion while the oxidizable materials are dispersed in liquid water. The process is carried out at temperatures between 450 degrees Fahrenheit and the critical temperature of water, but it is preferred to operate within a temperature range of about 480 degrees to about 625 degrees Fahrenheit and under elevated pressures sufficient to maintain the water at least partially in the liquid phase in the reactor. It is clearly distinguishable from oxidation or combustion of oxidizable materials in the dry state such as in a furnace in which the temperature of self-sustaining oxidation is several hundred degrees above the range of the present process and little or no liquid water is present and from vapor-phase oxidation methods. It is also to be distinguished from low-temperature partial oxidation procedures involving rupture of the lignin complex, as in the treatment of waste sulphite liquor, with precipitation and recovery of lignin per se.

These figures demonstrate conclusively that during the treatment in accordance with the invention nearly complete oxidation took place under dilute conditions in the presence of large volumes of water. Depending upon the time during which the waste sulphite liquor is subjected to the present procedure the oxidation can be carried out to practically 100 percent completion.

Carbon dioxide and nitrogen, in particular, are insoluble under the conditions of operation and therefore they remain as permanent gases which can, however, be put to use to perform work. The invention, therefore, includes the withdrawal of the permanent gases from the oxidized liquid effluent and the passage of the same into one end of a reciprocating-type compressor in which these gases are caused to actuate the piston of the compressor so as to produce compressed air for use in the oxidation procedure. These waste gases may be intermediately treated, if desired, to dry them, but such does not constitute an essential limitation upon the invention. Furthermore, the autogenetic rise in temperature occurring during the oxidation and the pressure maintenance makes available large quantities of steam at a pressure above about 160 pounds per square inch, and such steam can be usefully employed for any desired purpose in the mill, plant or other installation either as such or to perform work. It can, for example, be used to operate various types of machinery, for heating or preheating, and in general wherever the particular plant or mill requires heat or steam, thus largely reducing the necessity for producing steam independently by some other means and/or by the consumption of fuel. The steam may, in particular, be utilized in connection with the operation of the present procedure or may be passed into a turbine or other suitable equipment for the production of electricity, et cetera. Thus, after the invention has once been set into operation, it proceeds under such conditions that it produces its own requirements of heat and power and actually produces surplus heat and hence power which can be utilized in any manner desired.

It will be understood that the particular results secured depend upon the precise nature of the liquid waste effluent undergoing treatment and particularly the amount of oxidizable organic matter which is present therein. I have further found that it is unnecessary to employ any catalyst in carrying out the oxidation above described. The time and temperature factors are subject to some variation. The higher the temperature and/or the higher the pressure, the shorter will be the time required for the oxidation procedure, and, conversely, the lower the pressure and/or the temperature, the longer will be the time required for oxidation. In practice the temperature and pressure depend upon all the surrounding factors, but in general can be stated to be such that the oxidation does not require an inordinate length of time for its completion. In particular, time and temperature factors are those selected having due regard to the nature of the liquid waste effluent and the economic factors involved. It is, of course, undesirable to utilize minimum temperatures and/or minimum pressures and extremely dilute effluents since this would be uneconomical. One versed in this subject can readily calculate the thermodynamic data involved in any installation or liquid waste effluent. Similarly, it would not ordinarily be desirable to utilize the maximum pressures except under special conditions because this would involve the use of equipment capable of withstanding the high pressures and would be uneconomical as a regular procedure. As a corollary, at the higher pressures the efficiency of recovering power from the fixed gases is reduced and therefore there would be a greater loss.

It is to be understood that the foregoing is presented as illustrative and not as limitative or restrictive and that various additions, omissions, modifications and substitutions may be made without departing from the spirit or principles hereof. While I have referred above to the introduction of compressed air into a suitable tank or container, it is to be understood that I may and preferably do employ a series of inter-connected tanks or containers, since I have found that such an arrangement not only increases the amount of liquors which can be treated but that a most efficient system can be thus provided for accomplishing the objects outlined above. While I have particularly referred to the use of compressed air, it is to be understood that I may, if I so desire, employ compressed oxygen or any other compressed gaseous oxidizing agent or oxygen-furnishing material which is suitable for utilization under the conditions hereinabove described. The invention may, as already indicated, be applied to a wide variety of aqueous effluents, and in that connection the present invention may be applied to any aqueous waste effluent which contains organic matter which is to be destroyed or oxidized.

A particular advantage of my process is the recovery of usable water, substantially sterile, from aqueous wastes such as city sewerage. This makes possible a cyclic operation in instances where water supply is restricted, such as is sometimes encountered in city water and waste-disposal systems.

This application is a continuation-in-part of my prior-filed applications Serial Numbers 618,065, filed September 22, 1945 (which has now been abandoned) and 118,834, filed September 30, 1949.

I claim:

1. The method which includes: introducing a gas containing free oxygen and a liquid aqueous carbonaceous waste liquor, in a ratio of at least about one molecule of oxygen in said gas per atom of carbon in said liquor, into a reaction zone maintained under the vapor pressure of the reaction mixture at a temperature between at least 450 degrees Fahrenheit and the critical temperature of water.

2. The method which includes: introducing a gaseous oxidizing agent containing free oxygen into a liquid aqueous organic matter-containing waste liquor in a reaction zone maintained under superatmospheric pressure at a temperature above about 480 degrees Fahrenheit, said free oxygen being in amount at least theoretically necessary to convert substantially all of the carbon in said waste liquor to carbon dioxide and all of the hydrogen in said liquor to water and recovering from the reaction zone as substantially the only non-gaseous product of the process an effluent comprising essentially inorganic salts and liquid water.

3. The method which includes: introducing a gaseous oxidizing agent containing free oxygen into a liquid aqueous organic matter-containing waste liquor in a reaction zone maintained under superatmospheric pressure at a temperature between about 480 degrees Fahrenheit and the critical temperature of water, said free oxygen being in amount theoretically necessary to convert substantially all of the carbon in said waste liquor to carbon dioxide and all of the hydrogen in said liquor to water and removing from the reaction zone as substantially the only non-gaseous product of the process an effluent comprising essentially inorganic salts and liquid water.

4. The method which includes: introducing a gaseous oxidizing agent containing free oxygen into a liquid aqueous organic matter-containing waste liquor in a reaction zone maintained under superatmospheric pressure at a temperature between about 480 degrees Fahrenheit and 625 degrees Fahrenheit, said free oxygen being in amount theoretically necessary to convert substantially all of the carbon in said waste liquor to carbon dioxide and all of the hydrogen in said liquor to water and removing from the reaction zone as substantially the only non-gaseous product of the process an effluent comprising essentially inorganic salts and liquid water.

5. The method of disposing of organic wastes which includes: introducing a gas containing free oxygen and a liquid aqueous dispersion of the organic waste into a reaction zone at a temperature above about 480 degrees Fahrenheit and under sufficient pressure to maintain the water in the zone substantially in the liquid phase; bleeding steam and gaseous reaction products from the reaction zone; and maintaining the temperature in the reaction zone by the introduction thereinto of further quantities of said reactants, whereby oxidation of the organic matter substantially to a gaseous product is obtained.

6. The method of claim 1 wherein the waste liquor is waste sulphite liquor and the lower temperature limit in the reaction zone is about 480 degrees Fahrenheit.

7. A continuous liquid-phase process for the treatment of industrial waste liquors containing combustible organic constituents and water for the recovery of fuel values therefrom and to render the said waste liquors substantially innocuous and more readily disposable, which comprises charging the said waste liquors into a pressure container at an autogenetic temperature and provided with inlets for waste liquor for an oxygen-containing gas and with outlets for controllably discharging waste gases and a liquid effluent, charging into said pressure container an oxygen-containing gas at a pressure sufficient to maintain the water in the pressure container substantially in the liquid phase, and discharging from the said pressure container waste gases including gaseous oxidation products of the combustible constituents and a liquid effluent substantially free of combustible constituents, the combined charge rates of the waste liquors and oxygen containing gas being approximately equal to the combined discharge rates of the waste gases and liquid effluent, and the charge rate of the oxygen-containing gas being such that the amount of oxygen supplied to the reaction zone is sufficient to convert substantially all of the combustible organic material in the waste liquor to oxidation products during its passage through the pressure container and to maintain the autogenetic temperature between approximately 480 and approximately 625 degrees Fahrenheit.

8. A continuous process for the treatment of industrial waste liquors containing combustible organic constituents and water for the recovery of fuel values therefrom and to render the said waste liquors substantially innocuous and more readily disposable, which comprises charging the said waste liquors into a pressure container at an autogenetic oxidation temperature between approximately 480 and approximately 625 degrees Fahrenheit and provided with inlets for waste liquor and for an oxygen-containing gas and with outlets for controllably discharging under pressure waste gases and an aqueous fluid effluent, charging into the said pressure container and oxygen-containing gas at superatmospheric pressure and discharging from the said pressure container an aqueous fluid effluent substantially free of combustible organic constituents and waste gases including gaseous oxidation products of the combustible constituents, the combined charge rates of the waste liquors and oxygen-containing gas being approximately equal to the combined discharge rates of the waste gases and liquid effluent and the charge rate of the oxygen-containing gas being such that the amount of oxygen supplied to the reaction zone is sufficient to convert substantially all of the combustible organic material in the waste liquor to oxidation products during its passage through the pressure container and to maintain the contents of the container at the autogenetic temperature.

9. A process for treating industrial waste liquors containing combustible organic constituents and water, which comprises charging the said waste liquors into a reaction zone maintained at superatmospheric pressure and at an operating temperature within the range of approximately 480 to approximately 625 degrees Fahrenheit and at an operating pressure of approximately 1500 pounds per square inch, charging a stream of oxygen-containing gas into the said reaction zone, and discharging from the said zone waste gases including oxidation products of the combustible constituents and a liquid aqueous effluent substantially free of combustible constituents, the combined charging and discharging rates being approximately equal and the charge rate of the oxygen-containing gas being such that the amount of oxygen supplied to the reaction zone is sufficient to convert substantially all the combustible organic material in the waste liquor to combustion products and maintain the reaction zone at the preselected operating temperature.

FREDERICK J. ZIMMERMANN.

References Cited in the file of this patent

UNITED STATES PATENTS

| Number | Name | Date |
|---|---|---|
| 1,149,420 | Strehlenert | Aug. 10, 1915 |
| 2,258,401 | Badenhausen | Oct. 7, 1941 |

FOREIGN PATENTS

| Number | Country | Date |
|---|---|---|
| 266,096 | Germany | of 1912 |